United States Patent

Neary et al.

[11] Patent Number: 6,140,663
[45] Date of Patent: Oct. 31, 2000

[54] METHOD AND APPARATUS FOR ACCELERATED REMOVAL OF ENERGY AND RESIDUAL IMAGES FROM PHOSPHOR SCREEN EMPLOYED IN FILMLESS RADIOGRAPHY

[75] Inventors: Michael D. Neary, Phoenixville; Peter K. Soltani, West Chester, both of Pa.; Nicholas C. Ipri, Marietta, Ga.; Mark F. McAnally, Philadelphia, Pa.

[73] Assignee: Agfa-Gevaert, N.V., Mortsel, Belgium

[21] Appl. No.: 09/047,552

[22] Filed: Mar. 25, 1998

Related U.S. Application Data

[63] Continuation of application No. PCT/US97/05767, Apr. 7, 1997, abandoned.
[60] Provisional application No. 60/014,977, Apr. 8, 1996.
[51] Int. Cl.$^7$ .................................................. G03B 42/02
[52] U.S. Cl. ............................................................ 250/588
[58] Field of Search ............................................... 250/588

[56] References Cited

U.S. PATENT DOCUMENTS

| | | |
|---|---|---|
| 3,859,527 | 1/1975 | Luckey . |
| 4,236,078 | 11/1980 | Kotera e al. . |
| 4,239,968 | 12/1980 | Kotera et al. . |
| 4,258,264 | 3/1981 | Kotera et al. . |
| 4,496,838 | 1/1985 | Umemoto et al. . |
| 5,237,177 | 8/1993 | Kimura . |
| 5,422,208 | 6/1995 | Kojima et al. . |

FOREIGN PATENT DOCUMENTS

| | | |
|---|---|---|
| 60-182435 | 9/1985 | Japan . |
| 60-182436 | 9/1985 | Japan . |
| 2-259742 | 10/1990 | Japan . |
| 4-240632 | 8/1992 | Japan . |
| 5-23420 | 4/1993 | Japan . |
| WO 96/18205 | 6/1996 | WIPO . |

OTHER PUBLICATIONS

Product brochure entitled:"RADVIEW™ *Filmless Radiography, Film, Digitization, and Digital Imaging Products*" Liberty Technologies, Inc., Conshohocken, Pennsylvania 1995, 6 pages.
Product brochure entitled: "RADVIEW™ *Film Digitizer*", Liberty Technologies, Inc., Conshohocken, Pennsylvania 1995, 1 page.

(List continued on next page.)

*Primary Examiner*—Constantine Hannaher
*Attorney, Agent, or Firm*—Clark A. Jablon; Robert A. Sabourin

[57] ABSTRACT

Methods and apparatus for rapidly removing stored energy from (i.e., erasing) a reusable photostimulable storage phosphor screen use a first source of electromagnetic radiation which primarily outputs a wavelength or wavelengths of about 577 nanometers to about 597 nanometers, and a second source of electromagnetic radiation which primarily outputs a wavelength or wavelengths in the infrared region. Exposure to the second source of radiation may occur either after, or simultaneously with, exposure to the first source of radiation. During exposure to the first source of electromagnetic energy, ultraviolet radiation is filtered out so that none reaches the phosphor screen, or a first source is selected which does not output substantially any ultraviolet radiation. The first source of electromagnetic radiation erases the phosphor screen to a homogenized quasi-erased state. The second source of electromagnetic radiation erases the phosphor screen from the homogenized quasi-erased state to a fully or nearly fully erased state. The first source of electromagnetic radiation may be a sodium vapor lamp which also functions to remove residual images. Residual images may also be removed by exposing the phosphor screen to a source of electromagnetic radiation which outputs a wavelength or wavelengths including at least one of infrared and near-infrared, and a reduced amount of charging wavelengths. The process may include filtering any visible light having a wavelength below red light emitted from the second source of radiation.

54 Claims, 5 Drawing Sheets

OTHER PUBLICATIONS

Product brochure entitled: "RADVIEW™ *WorkStation*", Liberty Technologies, Inc., Conshohocken, Inc., Conshohcken, Pennsylvania, 1 page.

Product brochure entitled: "RADVIEW™ *Options Summary*"Liberty Technologies, Inc., Conshohocken, Pennsylvania 1995, 1 page.

Keller, et al., "Quenching, Stimulation, and Exhaustion Studies on Some Infrared Stimulable Phosphors", *Physical Review*, vol. 111, No. 6 (Sep. 15, 1958), pp. 1533–1539.

Keller "Fluorescence Spectra Term Assignments, and Crystal Field Splittings of Rare Earth Activated Phosphors", *The Journal of Chemical Physics*, vol. 29, No. 1 (Jul. 1958), pp. 180–187.

Keller, et al. "Studies on Some Infrared Stimulable Phosphors", *Physical Review*, vol. 108, No. 3 (Nov. 1, 1957), pp. 663–676.

Keller "Variation of Valence State of Eu in SrS Phosphors", *The Journal of Chemical Physics*, vol. 30 No. 2 (Feb. 1959), pp. 556–560.

Product catalog for lamps, Halogen Double Ended Linear Lamps, Low–Pressure Sodium Lamps–SOX, pp. 53,82. Catalog and catalog publication dates unknown.

International Search Report for PCT/US97/05767, 4 pages.

International Written Opinion for PCT/US97/05767, 6 pages.

ERASER TEST DATA

| TIME (sec.) | Average Energy Level (A/D counts) | Delta (A/D counts) |
|---|---|---|
| 1 | 129 | 987 |
| 60 | 3306 | 150 |
| 120 | 3378 | 55 |
| 180 | 3405 | 12 |
| 240 | 3428 | 4 |

METHOD AND APPARATUS FOR ACCELERATED REMOVAL OF ENERGY AND RESIDUAL IMAGES FROM PHOSPHOR SCREEN EMPLOYED IN FILMLESS RADIOGRAPHY

CROSS-REFERENCE TO RELATED APPLICATIONS

This application is a continuation of copending International Application No. PCT/US97/05767 filed Apr. 7, 1997, entitled "STORAGE PHOSPHOR ERASURE USING YELLOW AND/OR INFRARED" (originally entitled "METHOD AND APPARATUS FOR ACCELERATED REMOVAL OF ENERGY AND RESIDUAL IMAGES FROM PHOSPHOR SCREEN EMPLOYED IN FILMLESS RADIOGRAPHY"), and which designated the United States, now abondoned the entire disclosure of which is incorporated herein by reference.

This application claims the benefit of U.S. Provisional Application No. 60/014,977, filed Apr. 8, 1996, entitled "METHOD AND APPARATUS FOR ACCELERATED REMOVAL OF ENERGY FROM PHOSPHOR SCREEN EMPLOYED IN FILMLESS RADIOGRAPHY."

BACKGROUND OF THE INVENTION

The present invention relates generally to a method and apparatus for the removal of stored energy from a storage phosphor screen and, more particularly, to such a method and apparatus for accelerated removal of energy stored within a reusable photostimulable storage phosphor screen which has previously been exposed to radiation to allow for prompt reuse of the screen in filmless radiography.

It is well known to use photostimulable storage phosphor screens (hereinafter referred to as a "phosphor screen") for performing filmless radiography. Some such phosphor screens are created by applying a coating of a phosphor layer onto a thin, flexible, rugged substrate, generally formed of a polymeric material. Such substrates are generally rectangularly shaped in top plan view and have a thickness in the range of 0.1 mm to 30 mm (0.004"–1.181"). The substrates are typically made of acrylic or MYLAR® although other polymeric materials may be employed. Although the material used to make the substrate, the size of the substrate and even the shape of the substrate may vary from application to application, rectangularly shaped polymeric substrates are generally preferred and such substrates are generally available in several different sizes, including 14 inches×17 inches, 7 inches by 10 inches, and 7 inches×17 inches, or any size in between.

The phosphor coating layer may be applied to the substrate using a variety of processes including creating a fine powder of the mixed phosphor elements or components and, thereafter, applying the powder generally evenly over one principal surface of the substrate and securing the powdered phosphor components to the substrate using a suitable binder, adhesive, or the like.

In the preferred embodiment of the present invention, as described in greater detail hereinafter, the components of the phosphor powder include strontium sulfide doped with cerium and samarium (SrS:Ce,Sm). Other components, such as CaS:Ce,Sm; SrS:Eu,Sm; CaS:Eu,Sm; or components having the general composition $Ca_x,Sr_{1-x}$:R,Sm, where R is Ce or Eu, could be used if desired. Phosphor screens of this type are commercially available from Liberty Technologies, Inc., of Conshohocken, Pa. Although a single type of phosphor screen having the above-described phosphor components will be discussed throughout the present application, it should clearly be understood that the principles involved with the present invention are not limited to a particular size, shape, or type of phosphor screen nor are they limited to particular phosphor components of the phosphor screen.

The processes employed for creating and, thereafter, "reading" radiographic images using a phosphor screen of the type described above are also generally well known in the art. In general, a phosphor screen (having negligible stored energy) is positioned adjacent to a product, device, person or item (hereinafter referred to as an "item") for which an image is desired, and the item and the phosphor screen are exposed to radiation from a radiation source positioned in such a manner that at least some of the radiation passes through the item before exposing the phosphor screen. The phosphor screen absorbs energy from the received radiation at varying levels and, depending upon the structure, material, and other aspects of the item, a latent image of the item is created on the phosphor screen through a well known process known as "electron trapping". Typically, prior to the aforementioned radiographic exposure, the phosphor screen is first placed in a special cassette or other packaging device which prevents the phosphor screen from being exposed to ambient light that could detrimentally affect the latent image of the item stored on the phosphor screen. An intensifier, comprised of a thin sheet of lead, copper or some other metal, may be positioned between the item and the phosphor screen to enhance the quality of the latent image created on the phosphor screen when high radiation energies are employed.

After creation of the latent image on the phosphor screen, the phosphor screen is "read", typically by a laser scanner and digitizer using a photostimulated luminescence process which is generally well known in the art. In the reading process, the entire phosphor screen is scanned, in accordance with a predetermined scanning pattern, by a high resolution near-infrared laser having wavelengths between 750 nanometers to 1,600 nanometers, with a peak at about 1,000 nanometers and preferably at a wavelength of about 1,000 nanometers. The laser scan has the effect of stimulating or releasing trapped electrons. The stimulation and release of the trapped electrons causes visible luminescence to be emitted from the phosphor screen in proportion to the energy level stored at specific locations on the phosphor screen (i.e., pixels). The intensity of the emitted luminescence for each area or pixel of the phosphor screen is electronically measured, utilizing a light sensitive device such as a photomultiplier tube, digitized and stored in a computer memory as a function of the laser position on the phosphor screen, thereby creating a gray scale image. Once stored within the computer memory, the digitized data representative of the latent image read from the phosphor screen may be recalled and displayed, typically on a high resolution monitor, for analysis or may be printed for later review and analysis, including trend analysis.

The above-described filmless radiography process is generally well known and equipment for performing the process is generally available from manufacturers including Liberty Technologies, Inc., of Conshohocken, Pa. In general, the laser used to stimulate the trapped electrons for release of the latent image from the phosphor screen is scanned very fast so that the image data is acquired fast. Typically, the intensity of the laser is between 1 and 500 milliwatts and the size of the laser spot is 25–250 μm with the scan speed being between 5 and 500 microseconds per pixel. Thus, only a fraction of the total of the energy stored within the phosphor screen to create the latent image is released, depending upon the amount of laser energy employed. As a result, a substantial amount of energy, including the latent image, remains stored in the phosphor screen once the image reading process has been completed and the digital image data of the radiographed item has been stored in the computer memory. Because phosphor screens of the type described above are relatively expensive to produce, it is desirable to have the ability to reuse such phosphor screens multiple times. A phosphor screen which is still storing a substantial amount of energy, including a latent image of a previously radiographed item, cannot be reused to obtain a latent image of a second or subsequent item without creating double or multiple latent images or latent image distortion on the phosphor screen.

As a result, to reuse the phosphor screen, a process is employed for removing energy and reducing the overall energy level stored in the phosphor screen, sometimes called erasing, at least to a level where the previously stored latent image is no longer readable and no longer detrimentally affects any latent image which is thereafter created on the phosphor screen. In general, the erasing process which is currently employed involves exposing the phosphor screen to infrared radiation at a predetermined intensity and within a prescribed wavelength range (about 1,000 nanometers) for a predetermined period of time. Typically, erasing a phosphor screen in this manner involves exposing the phosphor screen to the infrared radiation for an extended period, typically between 30 minutes and one hour or longer than one hour, the period being determined by several factors, including the amount or intensity of the energy stored within the phosphor screen.

While the above-described erasing process is effective in eliminating or substantially reducing the energy level within a phosphor screen, at least to a level low enough so that the previously stored latent image can no longer detrimentally affect any later created latent image, the erasing process takes an inordinately long time to complete, particularly in view of the much shorter time necessary for creating and reading the latent image. Additionally, the use of infrared energy alone to erase latent images from a phosphor storage screen does not necessarily completely remove the latent image therefrom. Experimental data show that the use of infrared energy tends to lower the energy levels of the screen uniformly so that portions of the screen with latent images as well as non-image areas are all erased linearly. Rescanning and reexamination of the erased screen and its resulting digital image generally reveals some artifacts of the original latent image, thus rendering the screen unacceptable for further imaging. As a result, there is a need for a process for erasing such phosphor screens in a much more efficient, complete, and rapid or accelerated manner.

The present invention, as hereinafter described in greater detail and as illustrated in the attached figures, relates to a method and corresponding apparatus for substantially reducing and/or eliminating energy stored within a phosphor screen in a relatively short period of time, typically on the order of thirty seconds to ten minutes. The use of the present invention permits the process of reading and then erasing a phosphor screen for subsequent use within a time period which is substantially faster than use of the prior art infrared erasing process as described above. Furthermore, the erasing is more uniform and more complete.

BRIEF SUMMARY OF THE INVENTION

A method is disclosed for removing stored energy from a storage phosphor screen. The method comprises the steps of placing the storage phosphor screen near a source of electromagnetic radiation which outputs a wavelength or wavelengths of about 577 nanometers to about 597 nanometers, such as a low-pressure sodium vapor lamp, exposing the storage phosphor screen to the source of electromagnetic radiation for a predetermined period of time, placing the storage phosphor screen near a second source of electromagnetic radiation which outputs a wavelength or wavelengths including at least one of infrared and near-infrared, and exposing the storage phosphor screen to electromagnetic radiation emitted from the second source. The method may further include the step of filtering any visible light having a wavelength below red light emitted from the second source of radiation. The first and second source of electromagnetic radiation may be selected from the group consisting of a yellow light emitting diode, a yellow laser and a low-pressure sodium vapor lamp. The first source of electromagnetic radiation may be a source which does not output substantially any wavelengths in the ultraviolet region.

Yet another embodiment of the invention provides an apparatus for removing stored energy from a storage phosphor screen. The apparatus comprises a housing having an opening and a first source of electromagnetic radiation within the housing. The first radiation source outputs a wavelength or wavelengths of about 577 nanometers to about 597 nanometers, such as a sodium vapor bulb, which passes through the opening. The storage phosphor screen may be placed near the opening to be exposed to the first radiation source. The apparatus also include a second source of electromagnetic radiation which outputs at least one of infrared and near-infrared light which is received in the exposure area. An ultraviolet light filter is disposed between the first source and exposure area to prevent unwanted ultraviolet light from reaching the exposure area. Alternatively, the first source of radiation is selected to be a source which does not output substantially any wavelengths in the ultraviolet region.

Yet another embodiment of the invention provides a method for removing residual images from a storage phosphor screen. The method comprises the steps of placing the storage phosphor screen near a source of electromagnetic radiation which outputs a wavelength or wavelengths including at least one of infrared and near-infrared, the source of electromagnetic radiation having an output filter selected to pass infrared and visible red wavelengths, and a small amount of phosphor charging wavelengths, and exposing the storage phosphor screen to the filtered output for a predetermined period of time.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred as well as data resulting from testing of such embodiments. It should be understood, however, that the invention is not limited to the precise arrangements and instrumentalities shown. In the drawings.

DETAILED DESCRIPTION OF THE INVENTION

Certain terminology is used herein for convenience only and is not be taken as a limitation on the present invention. In the drawings, the same reference numerals are employed for designating the same elements throughout the several figures.

The present invention is based upon the discovery that phosphors used in phosphor screens of the type described above, in addition to releasing energy when scanned with a high resolution laser having a wavelength in the infrared range of the electromagnetic spectrum also release stored energy at one or more other wavelengths. More particularly, in the case of a phosphor screen made from strontium sulfide doped with cerium and samarium (SrS:Ce,Sm), it was discovered that energy is also released from the phosphor screen when the phosphor screen is exposed to light having a wavelength of approximately 590 nanometers which is in the yellow band of the visible spectrum. Further research determined that a low-pressure sodium vapor lamp primarily emits yellow light at a wavelength of approximately 589.8 nanometers with lesser energy at other wavelengths.

Figure 1:
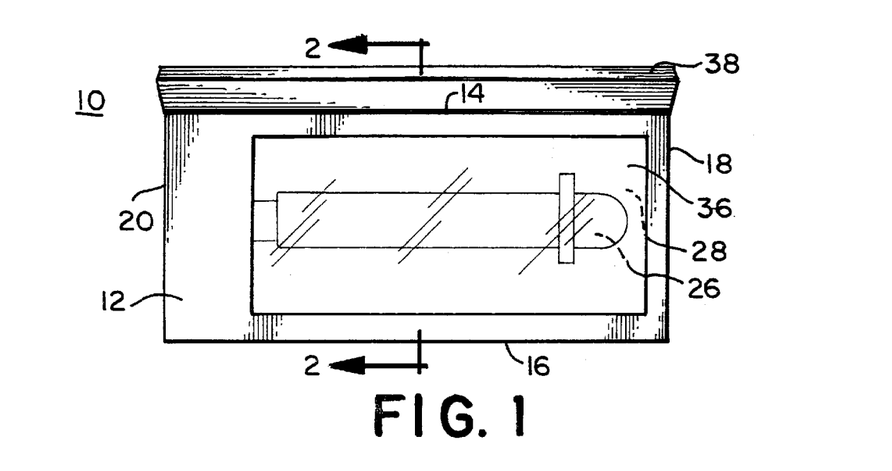
FIG. 1 is a top plan view schematic representation of a first embodiment of a phosphor screen eraser in accordance with the present invention.
Figure 2:
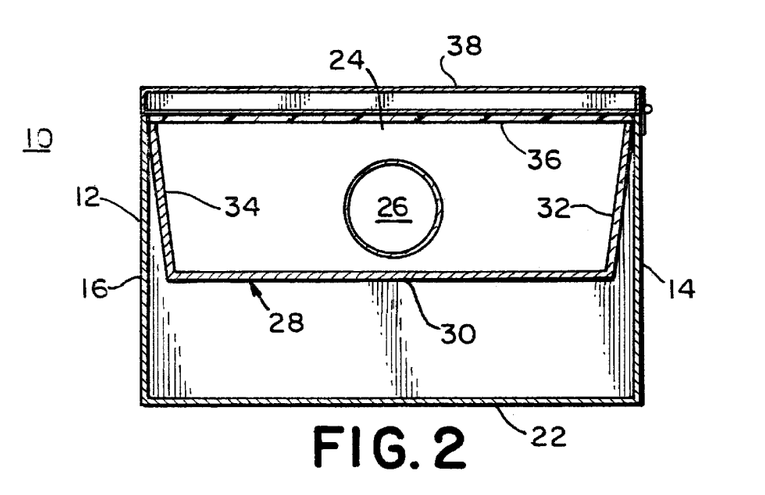
FIG. 2 is a sectional view of the eraser taken along line 2—2 of FIG. 1 with a movable cover in the closed position.

FIGS. 1 and 2 illustrate an apparatus 10 in accordance with the first embodiment of the present invention which uses the discoveries set forth above to remove stored energy from (i.e., erase) a phosphor screen which has previously been exposed to radiation, for the creation of a latent image thereon. The apparatus 10 comprises a generally box-like housing 12 which preferably is made of sheet metal or some other rigid, high strength, heat-resistant, opaque lightweight material such as a polymer. The housing 12 includes generally closed, light-impervious principal walls including side walls 14, 16, end walls 18, 20, and bottom wall 22, as well as a generally open top 24. A generally elongated, low-pressure sodium vapor (SOX) lamp 26 is installed within the housing 12 proximate to the bottom wall 22. One end of the sodium vapor lamp 26 proximate end wall 20 has a base which is connected to a suitable auto transformer power source (not shown), preferably through an ON/OFF switch and a suitable fuse (not shown). As stated above, the light emitted from the low-pressure sodium vapor lamp 26, in addition to containing some infrared energy, is primarily at a wavelength of 589.8 nanometers within the yellow band of the visible spectrum. A suitable reflector 28 is a three-sided planar reflector having a base portion 30 proximate to the bottom wall 22 of the housing 12 and two sidewalls 32, 34 extending upwardly from the base portion 30 toward the open top 24 of the housing 12. The reflector 28 is preferably made of generally flat surfaced electropolished aluminum but could be made of some other material, if desired. One side of the reflector 28 is proximate to the bottom wall 22, and one side is proximate to the side walls 14, 16 and the end walls 18, 20. In this manner, light energy emitted from the sodium vapor lamp 26 is directed or focused primarily toward the open top 24 of the housing 12. It will be appreciated that while the present embodiment employs a sodium vapor lamp 26, other sources of light at or near a wavelength of 590 nanometers, such as yellow light emitting diodes, yellow lasers, and the like could be used instead. Yellow light is typically defined as electromagnetic radiation having wavelengths of about 577 nanometers to about 597 nanometers.

The open top 24 of the housing 12 is covered by a clear plastic filter or lens 36. The filter 36 is employed for supporting a phosphor screen (not shown) with the phosphor coated side of the phosphor screen facing the sodium vapor lamp 26 and the reflector 28 so the phosphor screen is exposed to the maximum amount of yellow light from the sodium vapor lamp 26. The filter 36 also blocks or filters out light energy at undesirable wavelengths such as ultraviolet light. In the present embodiment, different filters may alternatively be employed, such as a clear diffuser made of LEXAN® with a thickness of approximately 3/16 of an inch or 1/8 of an inch. Other filter types and constructions will be apparent to those skilled in the art and could alternatively be employed. For example, the lens 36 can be a UV-absorbing tempered glass platen. A movable cover member 38, which may include a latch mechanism (not shown) is pivotally secured by hinges or in some other manner to one side wall 14 of the housing 12 and is adapted to completely cover a phosphor screen placed on the top surface of the filter 36 during the operation of the apparatus 10 to protect the phosphor screen from exposure to ambient or other light.

Figure 3:
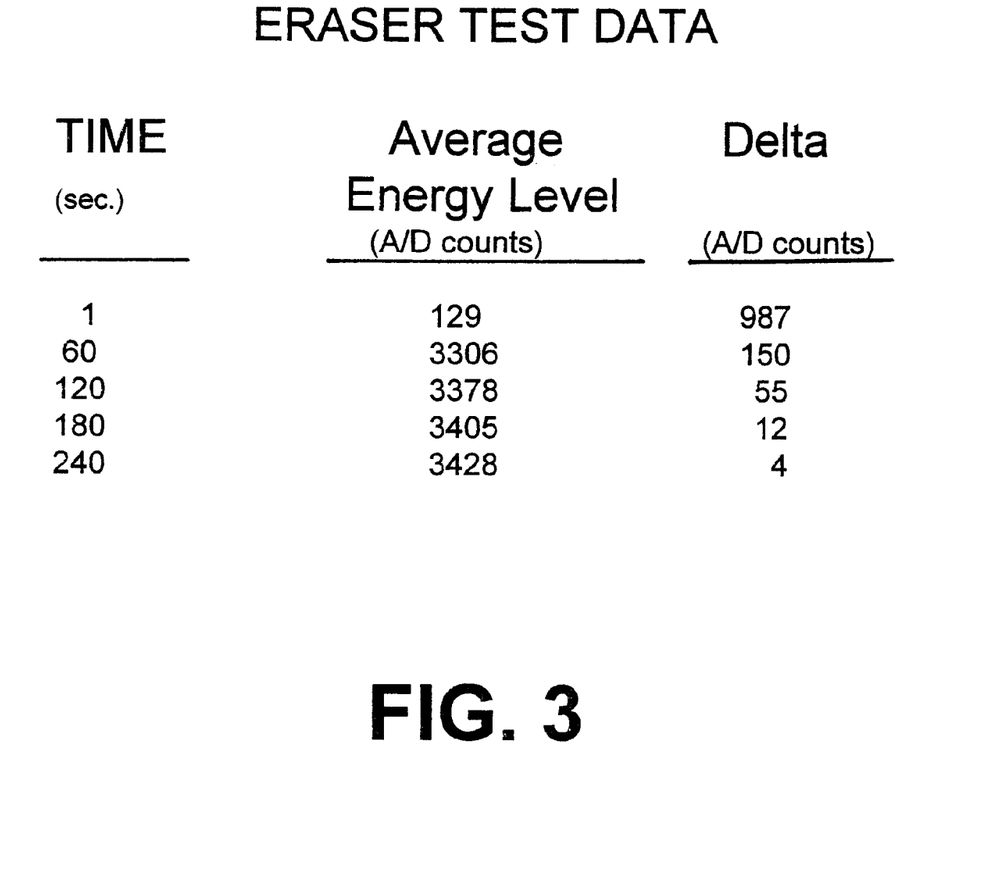
FIG. 3 is a chart of actual test data from a test conducted with the eraser of FIG. 1.

FIG. 3 documents an actual test performed on the same or substantially the same phosphor screens utilizing the apparatus 10 with a 1/8" LEXAN® filter 36. For testing the apparatus 10, the average energy level of the energy stored by the phosphor screen was determined after being exposed to yellow light from 90 W sodium vapor lamp 26 in sixty-second intervals. Delta, which is the maximum density minus minimum density, was also measured. Because of the measurement technologies employed, the energy level of the phosphor screen is recorded as an absolute gray scale with 4,000 being totally free of energy (black) and 0 being the maximum amount of energy (light) which can be detected. FIG. 3 clearly demonstrates that exposure of the phosphor screen to emitted energy from the sodium vapor lamp 26 results in an initial rapid loss of stored energy from the phosphor screen. In fact, after only approximately three minutes of exposure to the sodium vapor lamp 26, the average energy level in the phosphor screen was reduced to a low, generally even energy level, as indicated by a high A/D count. It will also be apparent from the data in FIG. 3 that additional exposure of the phosphor screen to emitted energy from the sodium vapor lamp 26 does not appreciably further reduce the level of energy stored within the phosphor screen even over an extended time period. A LEXAN® filter is optional in the embodiment of the invention disclosed below with respect to FIG. 8.

Erasure speed depends upon the particular phosphor formulation. The phosphor formulation used in conducting the test of FIG. 3 is susceptible to faster erasure compared to other known phosphor formulations. The radiographic properties of the phosphor screen must be balanced against erasure speed when selecting a suitable phosphor screen for a particular application.

One problem associated with the prior art infrared energy reducing or erasing process is that the infrared tends to generally evenly reduce the amount of energy over the entire phosphor screen. Thus, portions of the phosphor screen in which a relatively low level of energy is initially stored, reach a lower, acceptable energy level within a relatively short time period whereas other portions of the phosphor screen which had been exposed to high levels of radiation, such as areas in which no item to be radiographed was present, tend to store extremely high levels of energy. Exposure of the phosphor screen to the infrared erasing process also reduced the energy levels in areas of the phosphor screen in which such high energy is stored. However, the rate at which the energy is released from the phosphor screen is generally constant throughout the entire area of the phosphor screen. Thus, the time necessary to reduce the energy level on all portions of the phosphor screen is directly dependent upon the amount of energy stored in the highest intensity portions of the phosphor screen since the entire screen must be exposed to the erasing process. Furthermore, some aspects of the second latent image may still be detected after an abbreviated erase cycle, since all energy levels are reduced at a uniform rate.

As presently understood, the sodium vapor lamp 26 reduces the energy level in the phosphor screen faster than occurs in the infrared erasing process. It is believed that energy levels in those portions of the phosphor screen in which the stored energy level was minimal have a tendency to actually slightly increase in energy to a level which generally exceeds the initial energy level of such areas. The net result is, after the phosphor screen has been exposed to the sodium vapor lamp for approximately five minutes or less, the energy levels of the areas of the phosphor screen which initially contained high energy are reduced dramatically and energy levels in those areas of the phosphor screen which initially stored energy at a low level are increased slightly so that the overall level of energy remaining in the phosphor screen is generally uniform throughout the entire screen but is not at or near a zero energy level. Such uniformity is desirable because it acts to completely obliterate the stored latent image on the phosphor storage screen. As discussed above, further exposure to the sodium vapor lamp 26, even for an extended time period, does not appreciably further reduce the average energy level within the phosphor screen.

To reduce the remaining energy in the phosphor screen to be at or very near zero, the phosphor screen is thereafter exposed to infrared energy in essentially the same manner as described above in the conventional or prior art erasing process. However, since the energy level across the entire screen is uniform and starts out relatively low, the exposure time to the infrared energy necessary to reduce the energy level in the entire phosphor screen to zero or near zero is substantially less than with the prior art infrared process, primarily because of the uniformity in the energy level of the phosphor screen (due to the prior exposure to the sodium vapor lamp 26) upon initiation of the infrared erasing process. Experimental data have shown that a phosphor screen which is initially exposed to a sodium vapor lamp 26 as described above for about three to about five minutes, thereafter, is exposed to infrared radiation in accordance with the prior art process for an additional period of about five to about seven minutes, results in a phosphor screen in which most of the energy has been released and the entirety of the previously stored latent image has been erased to the point where the phosphor screen can be immediately reused for the creation of a new radiographic image without any double imaging, distortion, or other image problems. In other words, the use of the two-step process as described above provides, in ten minutes or less, a phosphor screen in which the energy level has been reduced or erased to approximately the same level as would have occurred in connection with exposure to infrared energy in accordance with the prior art process for up to one full hour or more.

Figure 4:
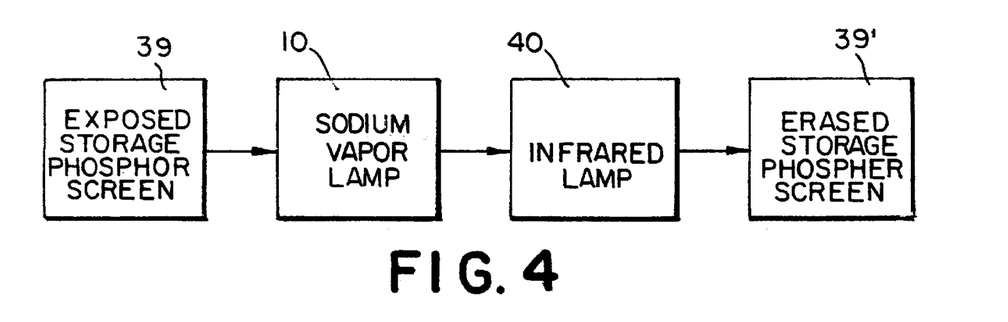
FIG. 4 is a schematic flow diagram of a first process for erasing a phosphor screen using the eraser apparatus of FIGS. 5 or 8.

FIG. 4 is a schematic flow diagram which illustrates an erasing process using eraser apparatus as shown in FIGS. 1 and 2, described above, or any of FIGS. 5–8, described below. To erase a previously exposed phosphor screen, the exposed phosphor screen 39 is first exposed to light from a sodium vapor lamp 26, such as by the apparatus 10 described above and shown in FIGS. 1 and 2. After about three to about five minutes, depending upon the highest initial energy level stored in the phosphor screen and the phosphor formulation, the phosphor screen 39 is transferred to a second apparatus 40 which comprises a standard infrared erasing apparatus of the type well known in the art and described above. The phosphor screen 39 is exposed to the infrared energy for about five to about seven minutes whereupon the erased phosphor screen 39' is removed and may be immediately reused for capturing another latent image. The erasing process may also be performed by a single erasing apparatus containing both a sodium vapor lamp and an infrared lamp, as shown in FIGS. 5–8, described below.

Figure 5:
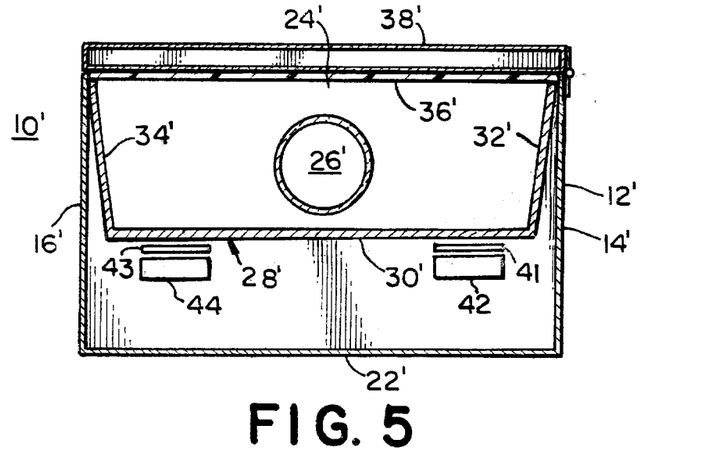
FIG. 5 is a sectional view similar to FIG. 2 but illustrating a second embodiment of the invention.

FIG. 5 illustrates a second preferred embodiment of the present invention 10' in which a single housing 12' contains both a sodium vapor lamp 26' and a source of infrared radiation, in the present embodiment, two quartz halogen or tungsten halogen lamps 42, 44, each including a suitable infrared filter 41, 43 to pass infrared light and block visible light from the lamps 42, 44. The lamps 42, 44 are of a type well known in the art which are installed within or behind openings within the reflector 28'. One suitable type of lamp 42, 44 has a bulb type known in the art as a T3 bulb, and more particular, a 150 W T3 bulb. One suitable filter 41, 43 is a long pass filter which passes infrared light, or red light and infrared light, and which has a cut-on wavelength between about 610 nanometers and 850 nanometers. One suitable long pass filter has a cut-on wavelength of 610 nanometers or about 630 nanometers, and is available from Schott Glass Company, Duryea, Pa. Such a filter passes only the erasing wavelengths of the visible spectrum and all of the infrared wavelengths. In this manner, a phosphor screen may receive light from the sodium vapor bulb 26' for about three to about five minutes whereupon the sodium vapor bulb 26' may be turned off and the tungsten halogen bulbs 42, 44 are energized to provide infrared energy to the phosphor screen for a second time period of about five to about seven minutes without having to move the phosphor screen to a second apparatus.

Figure 6:
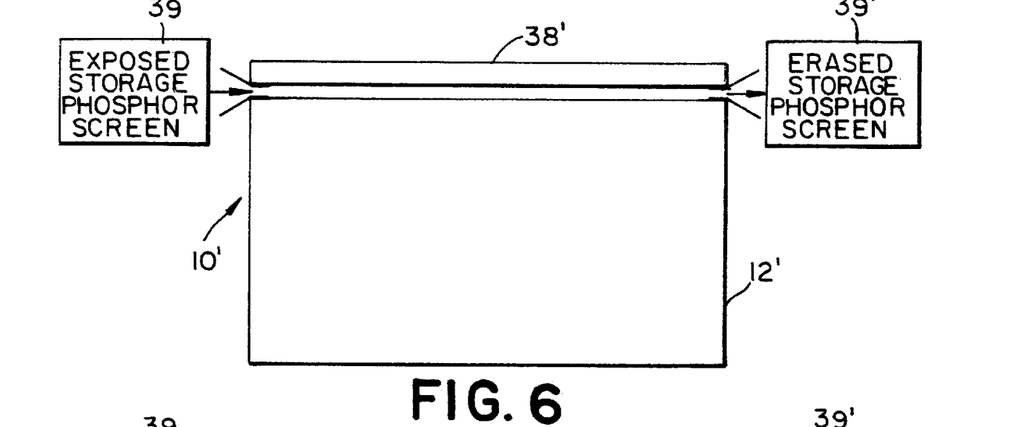
FIG. 6 is a schematic flow diagram of a second process for erasing a phosphor screen using the eraser of FIG. 5.

FIG. 6 is a schematic flow diagram of a second process for erasing a phosphor screen using the eraser in FIG. 5. Referring to FIGS. 5 and 6, the exposed storage phosphor screen 39 is fed into the eraser 10'. Once inside the eraser 10', the screen 39 is first exposed to energy from the sodium vapor bulb 26', and then to energy from the tungsten halogen bulbs 42, 44. The screen 39' is then removed or ejected from the eraser 10'. Additionally, if desired, the phosphor screen 39 could be exposed to energy from the tungsten halogen bulbs 42, 44 simultaneously with being exposed to light energy from the sodium vapor bulb 26' for the initial three to five minute period. Preferably, an appropriate intensity ratio is established between the sodium vapor bulb 26' and the tungsten halogen bulbs 42, 44 for achieving the desired result. Thereafter, the phosphor screen 39 may be exposed to the infrared energy from the tungsten halogen bulbs 42, 44 for an additional period of time of up to seven minutes before being removed for reuse.

Figure 7:
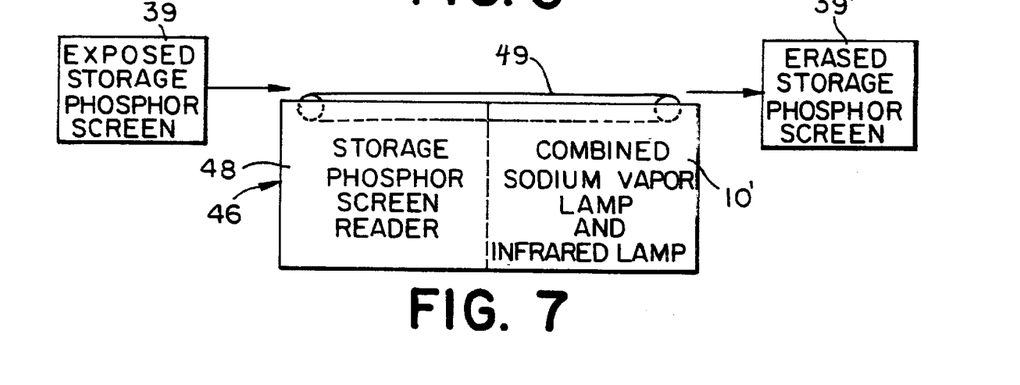
FIG. 7 is a schematic flow diagram of a third process for reading and erasing a phosphor screen using the eraser of FIG. 5.

FIG. 7 is a schematic flow diagram of a third process for reading and erasing a phosphor screen using the eraser of FIG. 5. The process shown in FIG. 7 is performed using a combined reading/erasing apparatus 46 which includes a prior art storage phosphor screen reader 48 and the eraser 10' of FIG. 5. The exposed storage phosphor screen 39 is fed into the screen reader 48 which scans the screen 39 to "read" and thereafter digitize a latent image stored in the screen 39. The screen 39 is then fed into the eraser 10' and after erasing, is removed or ejected from the apparatus 46. The eraser 10' is preferably in a separate area from that of the reader 48, such as proximate an end in which the phosphor screen 39 is removed or ejected from the apparatus 46. However, no particular location of the eraser 10' is required.

The apparatus and processes of FIGS. 5–7 may be incorporated into a continuous feed process wherein a stream of phosphor screens are read, erased and packaged for reuse. In the continuous feed process, rollers, conveyer belts or the like transport the screens 39 sequentially through a reader 48, a first erasure zone of SOX light (e.g., yellow light having a wavelength of 589.8 nanometers), a second erasure zone of infrared light, and a packaging zone wherein the erased screens 39 are automatically inserted into light-tight single screen or multi-screen storage cassettes (not shown). In the continuous feed process, the reading and cassette insertion steps are optional. A schematic representation of a conveyer 49 is shown in FIG. 7.

Figure 8:
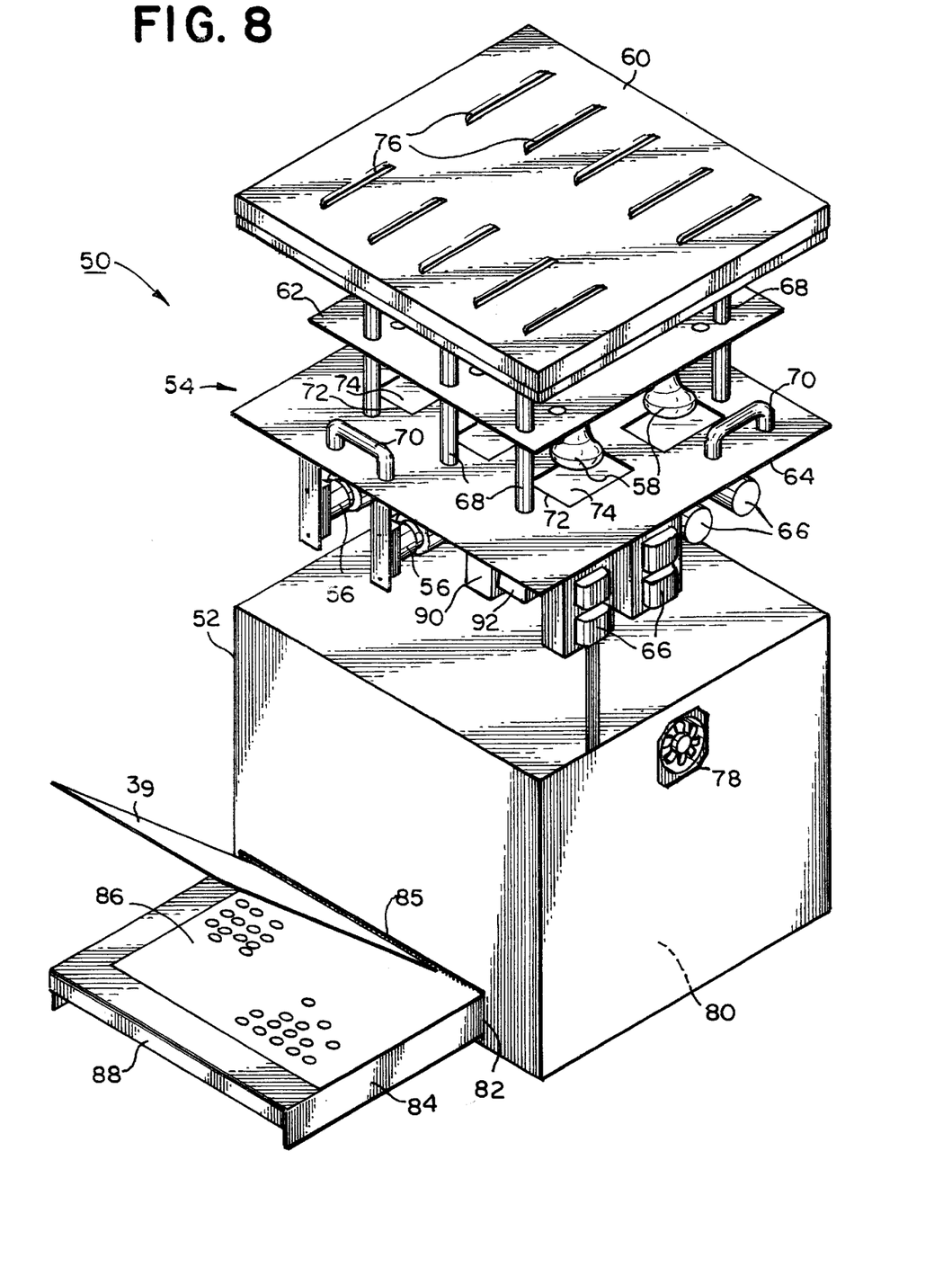
FIG. 8 is an exploded perspective view of a third embodiment of the invention.

FIG. 8 is a perspective view of a third embodiment of the invention for erasing a storage phosphor screen 39. This embodiment operates on the same principles as the first and second embodiments. Referring to FIG. 8, a box-shaped apparatus 50 is provided which has an open top housing 52. The housing 52 receives a removable subassembly 54 through its open top which contains one or more sources of yellow light 56, one or more sources of infrared light 58, and a lid 60 which becomes the housing top when the subassembly 54 is fully inserted into the housing 52. In addition, the subassembly 54 includes an upper mounting plate 62 for mounting the infrared light source(s) 58 thereto, a lower mounting plates 64 for mounting the yellow light source(s) 56 and related transformers and capacitors 66 thereto, and spacer bars 68 for separating the mounting plates 62, 64 from each other and from the lid 60. The lower mounting plate 64 includes handles 70 for manipulating the subassembly 54. The lower mounting plate 64 also includes a plurality of cutouts 72 for receiving infrared filters 74, which are similar to filters 41, 43 described above in FIG. 5. Each filter 74 is aligned with a respective infrared light source 58. To expel waste heat from the housing 52, the lid 60 of the subassembly includes venting louvers 76, and an upper sidewall of the housing 52 includes a fan 78. To assemble the apparatus 52, the subassembly 54 is lowered into the housing 52 until the lid 60 reaches the top of the housing 52. The dimensions of the lid 60 are selected so that the lid 60 makes a snug fit with the top of the housing 52. Further, the dimensions of the lower mounting plate 64 are selected so that the edges of the lower mounting plate 64 are flush with the sidewalls of the housing 52. In this manner, an exposure area 80 is defined between the lower mounting plate 64 and the housing base which is substantially light-tight with respect to ambient light.

A front wall of the housing 52 includes an opening 82 for receiving a pullout drawer 84. A strip brush seal 85 is provided along the edges of the opening 82 to make a seal at the opening 82 when the pullout drawer 84 is closed. The seal is substantially light-tight with respect to ambient light. The pull-out drawer 84 has a perforated tray 86 for receiving the phosphor screen 39 and a handle 88 for opening and closing the drawer 84.

To erase a phosphor screen 39, the screen 39 is placed on the tray 86 of the pullout drawer 84. The drawer 84 is closed, thereby bringing the screen 39 into the light-tight exposure area 80. The light sources 56, 58 are then switched on and off, either sequentially or simultaneously, for predetermined timed periods by one or more timers 90 and switch circuitry 92 connected to the light sources 56, 58. After erasing, the drawer 84 is opened and the screen 39 is removed therefrom.

In one preferred embodiment of the apparatus of FIG. 8, the yellow light is provided by one 90 watt SOX bulb or two 55 watt SOX bulbs, and the infrared light source 58 is provided by about six to about nine tungsten halogen bulbs. Six tungsten halogen bulbs are shown in FIG. 8. The embodiment of FIG. 8 also preferably includes a filter (not shown) similar to the filter 36 shown in FIGS. 1 and 2 to block or filter out ultraviolet light emitted from the SOX bulb(s).

The embodiment of FIG. 8 has numerous advantages over the embodiments of FIGS. 1 and 5, including improved heat dissipation via natural convection of heat through the louvers 76, reduced likelihood of scratching the phosphor screen 39 since it is subjected to less handling, and more uniform distribution of infrared light.

Figure 9:
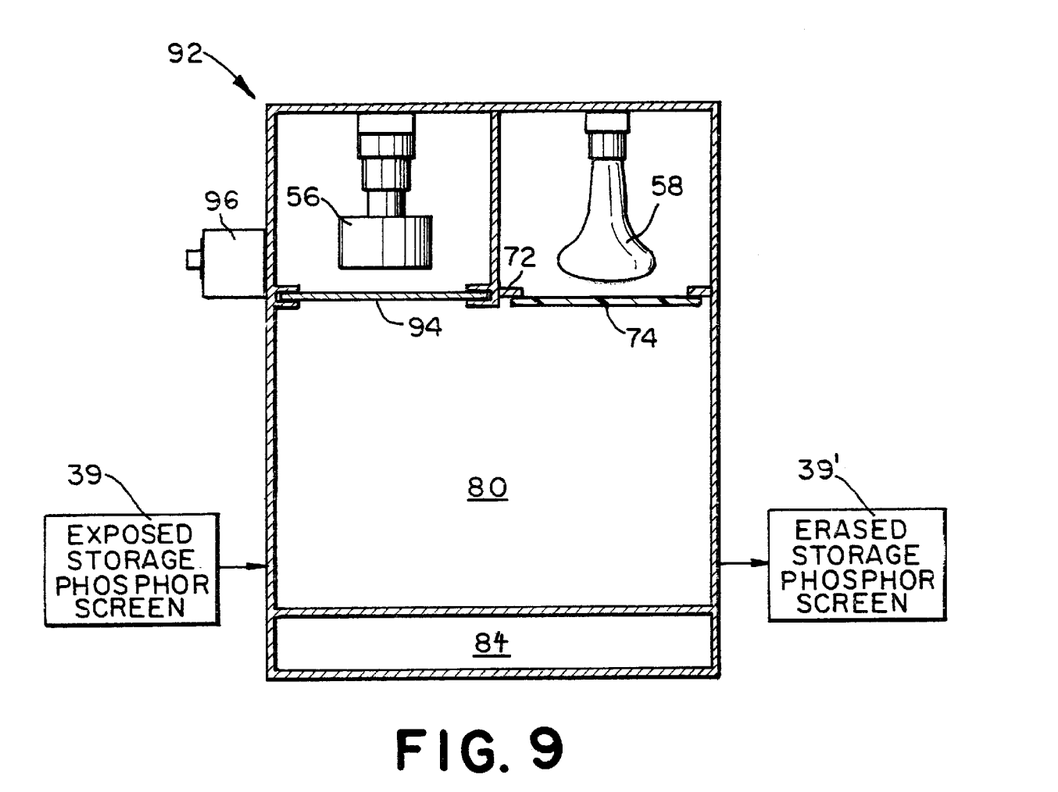
FIG. 9 is a schematic block diagram of a fourth embodiment of the invention.

FIG. 9 is a schematic block diagram of a fourth embodiment of the present invention. The housing and light sources in this embodiment may be similar to any of the previously described embodiments. As discussed above, it is preferred that the yellow light source and infrared light source be controlled by timers and switches. However, it is undesirable to cycle SOX lamps on and off because such lamps have a long warm-up time, which is typically 10–12 minutes to achieve full light output. Thus, in a high capacity application, it is preferred to keep the SOX lamps on at all times. To accommodate this condition, it is necessary to provide a means to block light from the SOX lamps from reaching the exposure area when the phosphor screen is being exposed to the infrared radiation.

Referring to FIG. 9, an eraser 92 is provided which includes a movable filter or shutter 94 for selectively blocking and allowing light from the light source 56 to reach the exposure area 80. The movement of the filter or shutter 94 is coordinated by timer 96 so that the filter or shutter 94 is in the proper position depending on the stage of the erasing process. The timer 96 may be the same timer 90 used in the FIG. 8 embodiment for turning the light sources on and off. If desired, a similar filter or shutter (not shown) may be used to selectively block or allow light from the infrared light source to reach the exposure area 80. Alternatively, a single filter or shutter may be arranged to selectively block one of the light sources. The filters may be moved by mechanical or electromechanical means and may be moved into and out of their respective positions by rotary action, linear translation or other mechanical action.

During the erasing process when the phosphor screen is exposed to the infrared light, it is usually desirable to filter out either all visible light, or all visible light which has a wavelength below red light from the source of the infrared light. For example, a tungsten halogen lamp requires such a filter because it emits a broad spectrum of wavelengths through both the visible and near-infrared spectrum. However, it may sometimes be desirable to allow a selected amount of visible light to reach the phosphor screen. This provides a small amount of charging wavelengths to the screen and reduces residual images. To do so, a short pass filter may be used with the tungsten halogen lamp to pass screen charging wavelengths which are below about 550 nanometers. One suitable short pass filter is a gel filter, such as a #025 Sunset Red filter available from Lee Filters, Andover, Hampshire, England. This gel filter allows a large percentage of the infrared erasing wavelengths to pass while allowing only a small percent of the charging wavelengths to pass through. This filter has about an 80–90% transmission at wavelengths at or above about 600 nanometers, and minimal transmission at wavelengths below about 550 nanometers. The amount or intensity of charging wavelengths that reach the exposure area may be controlled by using a neutral-density filter in conjunction with the short pass filter, or a low wattage bulb which naturally emits only a small amount of charging wavelengths. For example, a 150 W bulb may be replaced by a bulb which emits only 5–20% of the light energy of the 150 W bulb.

Experimental data show that residual images (as indicated by a residual image level) increase significantly as the filter cut-off wavelength associated with the tungsten halogen lamp increases. Thus, if screen charging wavelengths are emitted into the exposure area, suitable Schott, gel or other filters should be selected to pass primarily erasing wavelengths (infrared and red) and secondarily charging wavelengths.

By using a low-pressure sodium vapor lamp which primarily emits yellow light at a wavelength of approximately 589.8 nanometers to erase phosphor screens, the erasing time is substantially decreased from the time required to erase a phosphor screen using only infrared light. The sodium vapor lamp/infrared lamp combination eraser is even faster and more effective at erasing than a sodium vapor lamp eraser alone. When the two light sources are used sequentially, the sodium vapor lamp erases the phosphor screen to a homogenized quasi-erased state, and the infrared lamp erases the phosphor screen from the homogenized quasi-erased state to a fully or nearly fully erased state.

The exact theory for the results achieved by the present invention (the quick erasure and homogenized erasure state/ removal of residual images) due to the sodium vapor lamp are still under investigation. One theory for the reduction of residual images is that low levels of charging wavelengths act to even out the image while the majority of energy works to erase the image. Under this theory, the sodium vapor lamp may provide the charging wavelengths via emissions from starter gases within the bulb which emit wavelengths other than 589.8 nanometer. Another theory, which may be related to the other theory, is that the phosphors in the screen have a discharge curve with a peak at 589.8 nanometers and a charging curve which tapers off, but still has a finite value at 589.8 nanometers. Thus, there is both a large amount of discharging, as well as a small amount of charging, when the phosphors are exposed to wavelengths at 589.8 nanometers.

As discussed above, there are many different permutations for practicing the invention to rapidly reduce the energy level of a storage phosphor screen to a very low amount (hereafter, "total erase process"), and to minimize residual images. The total erase process is preferably a two-step process, although the second step can be deleted if total erasure is not necessary. In the first step, there is an initial erasure and residual image removal. In the second step, there is a final, low level erasure. Three options for the two-step total erase process are as follows:
(1) Step 1—Expose the screen to an unfiltered SOX lamp.
   Step 2—Expose the screen to a halogen lamp filtered to pass infrared wavelengths.
(2) Step 1—Expose the screen to an unfiltered SOX lamp.
   Step 2—Expose the screen to a halogen lamp filtered to pass infrared and some visible red wavelengths. The 610–700 nanometer wavelengths also act to erase the phosphor. Experimental data shows that a Schott filter RG610 LP provides the lowest level of erasure for this step.
(3) Step 1—Expose the screen to an unfiltered SOX lamp, while simultaneously exposing the screen to a halogen lamp filtered to pass infrared and some visible red wavelengths.
   Step 2—Expose the screen to a halogen lamp filtered to pass infrared and some visible red wavelengths.

If the primary interest is only residual image removal, two options are recommended, as follows:
(1) Expose the screen to an unfiltered SOX lamp.
(2) Expose the screen to a halogen lamp filtered to pass infrared and some visible red wavelengths, and a greatly reduced amount of charging wavelengths. Examples of suitable filters are a Schott Glass long pass filter GG495 LP and a gel filter, such as a #025 Sunset Red filter available from Lee Filters. These filters allow primarily erasure wavelengths with low levels of charging wavelengths to reach the screen. The approach of using the halogen lamp, instead of the SOX lamp, for residual image removal uses only one radiation source to provide both primarily the erasing wavelengths and secondarily the charging wavelengths. This approach may impact the speed of erasure since only a portion of the power of the halogen lamp is at the 589 wavelength erase peak for the phosphor, whereas the SOX bulb outputs almost all of its power at the 589 erase peak. However, the overall erase cycle may be faster than a method which uses an SOX bulb that is cycled on and off. This is because in a worst case scenario, the SOX bulb could take twelve minutes to warm up to full power while the halogen light sources operate at full power almost instantaneously.

The apparatus for performing the one and two step options set forth above has been previously described and shown in the figures.

The dimensions of the erasers and their components described above are selected to be appropriate for the particular size of the phosphor screens.

It is further noted that in one preferred embodiment of the present invention, the phosphor screen 39 is exposed to a first source of electromagnetic radiation in a manner which prevents ultraviolet light from reaching the screen 39. This may be accomplished by using the filter 36, as described above, or by using a first source of electromagnetic radiation which inherently outputs substantially no wavelengths in the ultraviolet region (e.g., a low-pressure sodium vapor lamp). The scope of the present invention includes either of these techniques.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:
1. A method for removing stored energy from a storage phosphor screen comprising the steps of:
   (a) placing the storage phosphor screen near a first source of electromagnetic radiation which outputs a wavelength or wavelengths of about 577 nanometers to about 597 nanometers;
   (b) exposing the storage phosphor screen to the electromagnetic radiation emitted from the first source while preventing ultraviolet light from reaching the storage phosphor screen, wherein the source of the electromagnetic radiation used in steps (a) and (b) is selected from the group consisting of a yellow light emitting diode, a yellow laser and a low-pressure sodium vapor lamp;

(c) placing the storage phosphor screen near a second source of electromagnetic radiation which outputs a wavelength or wavelengths including at least one of infrared and near-infrared; and (d) exposing the storage phosphor screen to electromagnetic radiation emitted from the second source.

2. A method according to claim 1 wherein step (b) is performed for a first predetermined period of time and step (d) is performed for a second predetermined period of time which is about the same as the first predetermined period of time.

3. A method according to claim 2 wherein step (b) is performed for up to about five minutes, and step (d) is performed for up to about five minutes.

4. A method according to claim 1 wherein the second source of electromagnetic radiation used in steps (c) and (d) is selected from the group consisting of a quartz halogen lamp and a tungsten halogen lamp.

5. A method according to claim 1 wherein step (d) is performed after step (b) is completed.

6. A method according to claim 1 wherein steps (b) and (d) are performed simultaneously.

7. A method according to claim 1 wherein steps (b) and (d) are performed simultaneously, followed by performing step (d) alone.

8. A method according to claim 1 wherein step (b) is performed in a first apparatus and step (d) is performed in a second apparatus.

9. A method according to claim 1 wherein steps (b) and (d) are performed in a single apparatus which includes the first and the second source of electromagnetic radiation, the method further including the step of:

(e) selectively activating either one or both of the first and the second source of electromagnetic radiation.

10. A method according to claim 1 wherein the first source of electromagnetic radiation outputs a wavelength of about 590 nanometers.

11. A method according to claim 1 wherein the storage phosphor screen is exposed to the first source of electromagnetic radiation for a sufficient period of time to bring the screen to a homogenized quasi-erased state.

12. A method for removing stored energy from a storage phosphor screen comprising the steps of:

(a) placing the storage phosphor screen near a first source of electromagnetic radiation which outputs a wavelength or wavelengths of about 577 nanometers to about 597 nanometers;

(b) exposing the storage phosphor screen to the electromagnetic radiation emitted from the first source while preventing ultraviolet light from reaching the storage phosphor screen;

(c) placing the storage phosphor screen near a second source of electromagnetic radiation which outputs a wavelength or wavelengths including at least one of infrared and near-infrared;

(d) exposing the storage phosphor screen to electromagnetic radiation emitted from the second source, wherein the second source of electromagnetic radiation used in steps (c) and (d) is selected from the group consisting of a quartz halogen lamp and a tungsten halogen lamp; and (e) filtering any visible light having a wavelength below red light emitted from the second source of electromagnetic radiation.

13. A method for removing stored energy from a storage phosphor screen comprising the steps of:

(a) placing the storage phosphor screen near a first source of electromagnetic radiation which outputs a wavelength or wavelengths of about 577 nanometers to about 597 nanometers and which does not output substantially any wavelengths in the ultraviolet region;

(b) exposing the storage phosphor screen to the electromagnetic radiation emitted from the first source, wherein the source of the electromagnetic radiation used in steps (a) and (b) is selected from the group consisting of a yellow light emitting diode, a yellow laser and a low-pressure sodium vapor lamp;

(c) placing the storage phosphor screen near a second source of electromagnetic radiation which outputs a wavelength or wavelengths including at least one of infrared and near-infrared; and (d) exposing the storage phosphor screen to electromagnetic radiation emitted from the second source.

14. A method according to claim 13 wherein step (b) is performed for a first predetermined period of time and step (d) is performed for a second predetermined period of time which is about the same as the first predetermined period of time.

15. A method according to claim 14 wherein step (b) is performed for up to about five minutes, and step (d) is performed for up to about five minutes.

16. A method according to claim 13 wherein the second source of electromagnetic radiation used in steps (c) and (d) is selected from the group consisting of a quartz halogen lamp and a tungsten halogen lamp.

17. A method according to claim 13 wherein step (d) is performed after step (b) is completed.

18. A method according to claim 13 wherein steps (b) and (d) are performed simultaneously.

19. A method according to claim 13 wherein steps (b) and (d) are performed simultaneously, followed by performing step (d) alone.

20. A method according to claim 13 wherein step (b) is performed in a first apparatus and step (d) is performed in a second apparatus.

21. A method according to claim 13 wherein steps (b) and (d) are performed in a single apparatus which includes the first and the second source of electromagnetic radiation, the method further including the step of:

(e) selectively activating either one or both of the first and the second source of electromagnetic radiation.

22. A method according to claim 13 wherein the first source of electromagnetic radiation outputs a wavelength of about 590 nanometers.

23. A method according to claim 13 wherein the storage phosphor screen is exposed to the first source of electromagnetic radiation for a sufficient period of time to bring the screen to a homogenized quasi-erased state.

24. A method for removing stored energy from a storage phosphor screen comprising the steps of:

(a) placing the storage phosphor screen near a first source of electromagnetic radiation which outputs a wavelength or wavelengths of about 577 nanometers to about 597 nanometers and which does not output substantially any wavelengths in the ultraviolet region;

(b) exposing the storage phosphor screen to the electromagnetic radiation emitted from the first source;

(c) placing the storage phosphor screen near a second source of electromagnetic radiation which outputs a wavelength or wavelengths including at least one of infrared and near-infrared;

(d) exposing the storage phosphor screen to electromagnetic radiation emitted from the second source, wherein the second source of electromagnetic radiation used in steps (c) and (d) is selected from the group consisting of a quartz halogen lamp and a tungsten halogen lamp, and (e) filtering any visible light having a wavelength below red light emitted from the second source of electromagnetic radiation.

25. An apparatus for removing stored energy from a storage phosphor screen comprising:

(a) a housing having an exposure area;

(b) a sodium vapor bulb within the housing, electromagnetic radiation from the sodium vapor bulb being received in the exposure area, (c) an ultraviolet light filter disposed between the sodium vapor bulb and the exposure area for preventing ultraviolet light from reaching the exposure area; and (d) a second source of electromagnetic radiation within the housing which outputs a wavelength or wavelengths including at least one of infrared and near-infrared, the second source of electromagnetic radiation being received in the exposure area, wherein the storage phosphor screen may be placed in the exposure area for exposure to the bulb and to the second source of electromagnetic radiation.

26. An apparatus according to claim 25 wherein the housing has an exposure area which is substantially light-tight with respect to ambient light.

27. An apparatus for removing stored energy from a storage phosphor screen comprising:

(a) a housing having an opening;

(b) a first source of electromagnetic radiation within the housing which outputs a wavelength or wavelengths of about 577 nanometers to about 597 nanometers, with electromagnetic radiation from the first source passing through the opening;

(c) an ultraviolet light filter disposed between the first source of electromagnetic radiation and the opening for preventing ultraviolet light from passing through the opening; and (d) a second source of electromagnetic radiation within the housing which outputs a wavelength or wavelengths including at least one of infrared and near-infrared, with electromagnetic radiation from the second source passing through the opening, wherein the storage phosphor screen may be placed near the opening to be exposed to the first and second sources of electromagnetic radiation, and wherein the first source of the electromagnetic radiation is selected from the group consisting of a yellow light emitting diode, a yellow laser and a low-pressure sodium vapor lamp.

28. An apparatus according to claim 27 further comprising:

(e) a transparent material for covering the opening and for acting as a surface for placing the storage phosphor screen thereagainst.

29. An apparatus according to claim 28 wherein the transparent material also acts as the ultraviolet light filter.

30. An apparatus according to claim 28 wherein the transparent material includes the ultraviolet light filter.

31. An apparatus according to claim 28 further comprising:

(f) a movable cover attached to the housing, the movable cover adapted to make a light-tight seal between the transparent material and the cover when the storage phosphor screen is placed therebetween, thereby preventing ambient light from reaching the storage phosphor screen during energy removal.

32. An apparatus according to claim 27 further comprising:

(e) a switch to selectively activate one or both of the first and the second source of electromagnetic radiation for a predetermined period of time.

33. An apparatus for removing stored energy from a storage phosphor screen comprising:

(a) a housing having an opening;

(b) a first source of electromagnetic radiation within the housing which outputs a wavelength or wavelengths of about 577 nanometers to about 597 nanometers, with electromagnetic radiation from the first source passing through the opening;

(c) an ultraviolet light filter disposed between the first source of electromagnetic radiation and the opening for preventing ultraviolet light from passing through the opening;

(d) a second source of electromagnetic radiation within the housing which outputs a wavelength or wavelengths including at least one of infrared and near-infrared, with electromagnetic radiation from the second source passing through the opening, wherein the storage phosphor screen may be placed near the opening to be exposed to the first and second sources of electromagnetic radiation; and (e) a conveyer for moving the storage phosphor screen past the opening.

34. An apparatus for removing stored energy from a storage phosphor screen comprising:

(a) a housing having an opening;

(b) a first source of electromagnetic radiation within the housing which outputs a wavelength or wavelengths of about 577 nanometers to about 597 nanometers, with electromagnetic radiation from the first source passing through the opening;

(c) an ultraviolet light filter disposed between the first source of electromagnetic radiation and the opening for preventing ultraviolet light from passing through the opening;

(d) a second source of electromagnetic radiation within the housing which outputs a wavelength or wavelengths including at least one of infrared and near-infrared, with electromagnetic radiation from the second source passing through the opening, wherein the storage phosphor screen may be placed near the opening to be exposed to the first and second sources of electromagnetic radiation; and (e) a reflector in the housing for directing light energy emitted from the first source of electromagnetic radiation toward the opening.

35. An apparatus for removing stored energy from a storage phosphor screen comprising:

(a) a housing having an opening;

(b) a first source of electromagnetic radiation within the housing which outputs a wavelength or wavelengths of about 577 nanometers to about 597 nanometers and which does not output substantially any wavelengths in the ultraviolet region, with electromagnetic radiation from the first source passing through the opening;

(c) a second source of electromagnetic radiation within the housing which outputs a wavelength or wavelengths including at least one of infrared and near-infrared, with electromagnetic radiation from the second source passing through the opening, wherein the storage phosphor screen may be placed near the opening to be exposed to the first and second sources of electromagnetic radiation.

36. An apparatus according to claim 35 further comprising:

(d) a transparent material for covering the opening and for acting as a surface for placing the storage phosphor screen thereagainst.

37. An apparatus according to claim 36 further comprising:

(e) a movable cover attached to the housing, the movable cover adapted to make a light-tight seal between the transparent material and the cover when the storage phosphor screen is placed therebetween, thereby preventing ambient light from reaching the storage phosphor screen during energy removal.

38. An apparatus according to claim 35 further comprising:

(d) a timer and switch circuit to selectively activate one or both of the first and the second source of electromagnetic radiation for a predetermined period of time.

39. An apparatus according to claim 35 further comprising:

(c) a conveyer for moving the storage phosphor screen past the opening.

40. An apparatus according to claim 35 further comprising a reflector in the housing for directing light energy emitted from the first source of electromagnetic radiation toward the opening.

41. An apparatus according to claim 35 wherein the first source of the electromagnetic radiation is selected from the group consisting of a yellow light emitting diode, a yellow laser and a low-pressure sodium vapor lamp.

42. An apparatus for removing stored energy from a storage phosphor screen comprising:

(a) a housing having an exposure area which is substantially light-tight with respect to ambient light;

(b) a first source of electromagnetic radiation within the housing which outputs a wavelength or wavelengths of about 577 nanometers to about 597 nanometers and which does not output substantially any wavelengths in the ultraviolet region, the electromagnetic radiation being received in the exposure area; and (c) a second source of electromagnetic radiation within the housing which outputs a wavelength or wavelengths including at least one of infrared and near-infrared, the second source of electromagnetic radiation being received in the exposure area, wherein the storage phosphor screen may be placed in the exposure area for exposure to the first and second source of electromagnetic radiation.

43. An apparatus according to claim 42 wherein the second source of electromagnetic radiation is selected from the group consisting of a quartz halogen lamp and a tungsten halogen lamp.

44. An apparatus according to claim 43 further comprising a short pass filter to pass screen charging wavelengths emitted from the second source of electromagnetic radiation which are below about 550 nanometers.

45. An apparatus according to claim 44 wherein the short pass filter is a gel filter.

46. An apparatus according to claim 45 further comprising a neutral-density filter for reducing the intensity of the charging wavelengths received in the exposure area.

47. An apparatus according to claim 43 further comprising a filter to filter out visible light emitted from the second source of electromagnetic radiation which has a wavelength below red light.

48. An apparatus according to claim 42 wherein the housing includes a single exposure area which receives electromagnetic radiation from the first and the second source, the apparatus further comprising:

(d) a switch to selectively activate one or both of the first and the second sources of electromagnetic radiation.

49. An apparatus according to claim 42 further comprising:

(d) a movable filter to selectively block electromagnetic radiation emitted from either the first or the second source of electromagnetic radiation from reaching the exposure area.

50. An apparatus according to claim 42 further comprising:

(d) one or more shutters to selectively block electromagnetic radiation emitted from either the first or the second source of electromagnetic radiation from reaching the exposure area.

51. An apparatus according to claim 42 wherein the housing includes a first and a second exposure area, the first exposure area receiving electromagnetic radiation only from the first source of electromagnetic radiation, and the second exposure area receiving electromagnetic radiation only from the second source of electromagnetic radiation.

52. An apparatus according to claim 42 wherein the housing includes a conveyer for feeding the storage phosphor screen into, and out from, the exposure area.

53. An apparatus according to claim 42 wherein the housing includes a pullout drawer which accepts the storage phosphor screen and allows for the insertion and removal of the storage phosphor screen therefrom, the pullout drawer being substantially light-tight with respect to ambient light.

54. An apparatus according to claim 42 wherein the first source of electromagnetic radiation is selected from the group consisting of a yellow light emitting diode, a yellow laser and a low-pressure sodium vapor lamp.

* * * * *